US008485884B2

(12) United States Patent
Brandt

(10) Patent No.: US 8,485,884 B2
(45) Date of Patent: Jul. 16, 2013

(54) REVERSE GAMING SYSTEMS AND METHODS

(75) Inventor: Andrew Brandt, Boulder, CO (US)

(73) Assignee: Ebet Ltd., North Ryde NSW (AU)

( * ) Notice: Subject to any disclaimer, the term of this patent is extended or adjusted under 35 U.S.C. 154(b) by 1380 days.

(21) Appl. No.: 11/829,727

(22) Filed: Jul. 27, 2007

(65) Prior Publication Data

US 2009/0029759 A1 Jan. 29, 2009

(51) Int. Cl.
*G06F 17/00* (2006.01)

(52) U.S. Cl.
USPC .................. 463/18; 463/16; 463/17; 463/19; 463/42

(58) Field of Classification Search
USPC ................................................ 463/16–19, 42
See application file for complete search history.

(56) References Cited

U.S. PATENT DOCUMENTS

2004/0157663 A1* 8/2004 Gunnar .......................... 463/42

* cited by examiner

*Primary Examiner* — Michael Cuff
(74) *Attorney, Agent, or Firm* — Christopher R. Carroll; The Small Patent Law Group LLC

(57) ABSTRACT

Generally, the systems and methods presented herein (the "utility") provide for reverse gaming. This utility allows players to vote for the next number to be chosen, in essence, shifting the odds of winning to the card that the players are holding. To illustrate, each player in a game may be given a card with a random selection of numbers. Instead of the House drawing certain numbers or balls, the players of the game vote on numbers to be selected. The number with the most votes, for example, may be selected and the players with that number may accordingly mark their cards. Players may also conspire together to hopefully increase the chances of their winning. For example, two players may compare cards to ascertain any common numbers between the two cards such that the two players may vote as one for a particular number.

17 Claims, 6 Drawing Sheets

REVERSE GAMING SYSTEMS AND METHODS

BACKGROUND

Games of chance exist in a variety of forms wherein each game, while occasionally requiring some level of skill to improve a player's odds of winning, has some odds of winning associated with it. For example, the odds of obtaining a "full house" (e.g., 3 Aces and a pair of Twos) in a game of five card draw poker are roughly 700 to 1 and the odds of obtaining a "royal flush" are roughly 650,000 to 1. Slot machines are also games in which owners of the slot machines (i.e., the "house") often advertise the odds of winning on their slot machines. For example, a casino may advertise that their slot machines payoff 97% of the time. While such is generally alluring to a player, the 97% chance of winning generally means that the casino is guaranteed to win 3% of all money deposited in their slot machines over time.

Other games of chance include Keno, lottery games, and Bingo which are based on the odds of a certain number being selected during a particular game. For example, in the so-called "US Bingo" (i.e., due to the manner in which it is played in the United States), each Bingo player is given a card marked with a grid containing a unique combination of numbers with the winning pattern on the card to be determined. On each turn, a caller randomly selects a numbered ball from a container and announces the number to all of the players. Each player then searches his or her card(s) for the called number, and if found, the player marks the number on the card corresponding to that ball. The selected ball is set aside so that it cannot be chosen again.

The caller continues to select and announce numbers until the first player forms the agreed pattern (e.g., one line, two lines, and "full house") on their card and shouts out the name of the pattern or "Bingo". Lines can generally be made horizontally, vertically, or diagonally. One of the most common patterns is called full card where the winning player is successful in marking all the numbers on the card. Other common patterns include single line, two lines, the four corners, centre cross, L, T, Y, postage stamp (i.e., 2×2 and in a corner) inner square (i.e., 4×4), roving square (i.e., 3×3), and roving kite (i.e., a 3×3 diamond). Inner squares, roving squares, and kites generally must be completely filled, with roving squares and kites being made anywhere on the card. Typically, the element of skill in the game regards the players' ability to search their card(s) for the called number in a relatively short time (i.e., before the next number is called).

In Keno, numbers are picked at a "Keno booth" to determine a winner in the game. "Keno runners" often walk around a casino offering number selection cards to anyone interested in playing. A Keno player generally chooses anywhere from 1 to 20 numbers and marks them on a Keno ticket of 80 numbers (i.e., 1 to 80). After picking numbers and recording them at the Keno booth, a Keno player watches a "big board" where winning Keno numbers light up or display on video monitors throughout the casino showing the selected numbers. For example, after the numbers of a particular game are chosen, a casino would draw 20 numbers at random. As the winning numbers light up, a player marks them on his or her card with a bright-colored marker. The player is paid out against his original wager based on how many numbers match the ones he marked on his ticket.

SUMMARY

Generally, systems and methods are presented herein (hereinafter the "utility") to provide for reverse gaming. For example, in typical games of chance, such as Keno and Bingo, a person in charge of the game (e.g., the House) may draw numbers such that the players of the game may mark their pre-numbered cards according to the numbers that are drawn. When a player matches certain numbers or a pattern of numbers on the card, the player may win the game and any award associated therewith. These games of chance, however, are based on the odds of the House selecting numbers that correspond to the players' cards. To at least give the impression that a player's odds can be improved, the utility generally allows players to vote for the next number to be chosen, in essence, shifting the odds of winning to the card that the players are holding.

To illustrate, each player in a game may be given a card with a random selection of numbers. Instead of the House drawing certain numbers or balls, the players of the game vote on numbers to be selected. The number with the most votes, for example, may be selected and the players with that number may accordingly mark their cards. Players may also conspire together to hopefully increase the chances of their winning. For example, two players may compare cards to ascertain any common numbers between the two cards such that the two players may vote as one for a particular number. That is, each player would "spend" their respective votes on a common number.

One can readily recognize the allure of such a team oriented game. The game itself may inspire players to form as teams to hopefully improve their chances of winning the game. For example, certain players may organize themselves as teams to increase their voting opportunities for a given number. Moreover, players may seek out other players for common numbers to increase their voting opportunities. In a Bingo environment, such a game may be generally referred to as "Cheater's Bingo" based on the fact that players conspire to improve their odds of selecting a particular number.

In another feature of the reverse gaming, players may be given extra voting opportunities. For example, once a player has attained a certain status (e.g., spending a certain amount of money, winning a predetermined number of games, etc.), the utility may provide extra votes such that a single player may strategically spend those votes on a desired number at a point in the game. Alternatively or additionally, players may purchase votes. For example, to improve a player's odds of winning, the player may be provided the opportunity to purchase additional votes that can be strategically spent by the player during certain periods of the game.

The game itself, however, is not limited to physical cards or, for that matter, to Bingo. Rather, one can readily understand how the game may be extended to computerized systems. For example, "electronic Bingo cards" may be dispensed to players such that the players may play the game on an electronic device, such as a computer kiosk, a home computer, a cell phone, a personal digital assistant (PDA), or the like. Accordingly, any reference to "cards" herein may be physical cards or electronically communicated means for displaying cards to a player. In this regard, players of the game using cell phones and/or PDAs may actually team up by viewing each other's cell phones to subsequently vote on desired numbers. In a home computer or computer kiosk environment, players may interact with one another through certain messaging schemes, such as instant messaging. Although, such instant messaging schemes may also be implemented in the cell phone and PDA applications of the game as well.

Additionally, the reverse gaming may be extended to other games. Examples of other games include Keno and lottery games. However, one can readily recognize that the game may be extended to other games of chance including card games. For example, players in a video poker environment may conspire to request that a certain card be shown in the dealer. To illustrate, two players in a video poker game using cell phones as their means for playing the game may conspire with one another and request a particular card via their cell phones. Other players in the game may be similarly conspiring in voting on certain cards. Once all of the votes are tallied, a centralized game processor may determine the card to be drawn next. Such a game may be limited to the playing cards of an actual deck. As one can readily observe, the reverse gaming aspect may be extended to almost any type of casino game, actual or virtual. Additional examples may include Pai Gow Poker and various slot machine games.

In one embodiment, a method of providing a game of chance (e.g., Bingo, Keno, Lottery, Blackjack, Poker, Craps, Baccarat, a video casino game, Roulette and/or other various casino and non casino games) that enables players to control an outcome of the game is presented. The method includes providing, to a plurality of players, a means for communicating game data in a game of chance and providing, to the plurality of players, game modules used in the game of chance. With each means for communicating game data, the method provides for transferring preferred game parameters from the plurality of users to a central processor. The method also includes processing the preferred game parameters to determine a game datum in the game of chance and transferring the game datum to the plurality of players for input to the game modules. The method further includes repeating the process elements of transferring preferred game parameters, processing the preferred game parameters, and transferring the game datum until an outcome of the game is reached. The transferred game datum differs from a previously transferred game datum.

Providing the game modules to the plurality of players may include electronically conveying the game modules to the plurality of players via the means for communicating the game data. For example, the means for communicating the game data may include a computer processor for processing transferred game datum and inputting the game datum to the game modules. Alternatively or additionally, providing the game modules to the plurality of players may include presenting physical game modules to the plurality of players.

Transferring the game datum to the plurality of players may include electronically transferring the game datum to the plurality of players. For example, electronically transferring the game datum to the plurality of players may include conveying the game datum to the means for communicating the game data. In this regard, conveying the game datum to the means for communicating the game data may include transmitting the game datum to the means for communicating the game data via radio frequency. The method may further include encrypting the game datum prior to transmission to the means for communicating the game data. Processing the preferred game parameters may include determining the game datum based on a number of votes from the plurality of players.

The method may further include providing a game environment that enables at least a portion of the plurality of players to cooperatively vote for the game datum. Alternatively or additionally, providing the game modules may include configuring the game modules with randomized game parameters.

In another embodiment, a method of providing a game of chance that enables players to control an outcome of the game includes providing game cards to a plurality of players, wherein each game card has a predetermined number of game characteristics and providing communication means to the plurality of players. The communication means provides for receiving votes from the plurality of players and each vote corresponds to at least one of the predetermined game characteristics. The method also includes processing the votes to select a game characteristic and transferring the selected game characteristic to the plurality of players as input to the game cards. The method further includes repeating the process elements of providing communication means, processing the votes, and transferring the game characteristic until an outcome of the game is reached. In this regard, repeating includes changes in the votes and changes in the selected game characteristic.

In another embodiment, a system for implementing a game of chance (e.g., Bingo, Keno, Lottery, Blackjack, Poker, Craps, Baccarat, a video casino game, Roulette and/or other various casino and non casino games) is presented and includes a processor configured for providing, to a plurality of players, game modules in a game of chance and determining game data to be input to at least a portion of the game modules. The system also includes communication means for communicating data pertaining to a game of chance between a plurality of players and the processor The portion of the players generally vote on a game parameter and transfer votes to the processor for determining the game data to be input to the portion of the game modules.

As mentioned, the game modules may be physical game cards they may be electronic game modules with the processor being a computer processor configured for electronically communicating with the communication means to deliver the electronic game modules to the plurality of players.

The communication means may include a transceiver for transferring the votes to the central processor and for receiving game data from the central processor. The transceiver may be a radiofrequency transceiver. The transceiver may be an electronic data module configured for conveying data between the processor and the communication means via wired communications.

The processor may be further configured for encrypting the game data transferred to the communication means. The communication means may be further configured for encrypting the votes transferred to the processor.

The system may further include at least one display for displaying a game datum resulting from a vote tabulation.

DETAILED DESCRIPTION OF THE DRAWINGS

Figure 1:
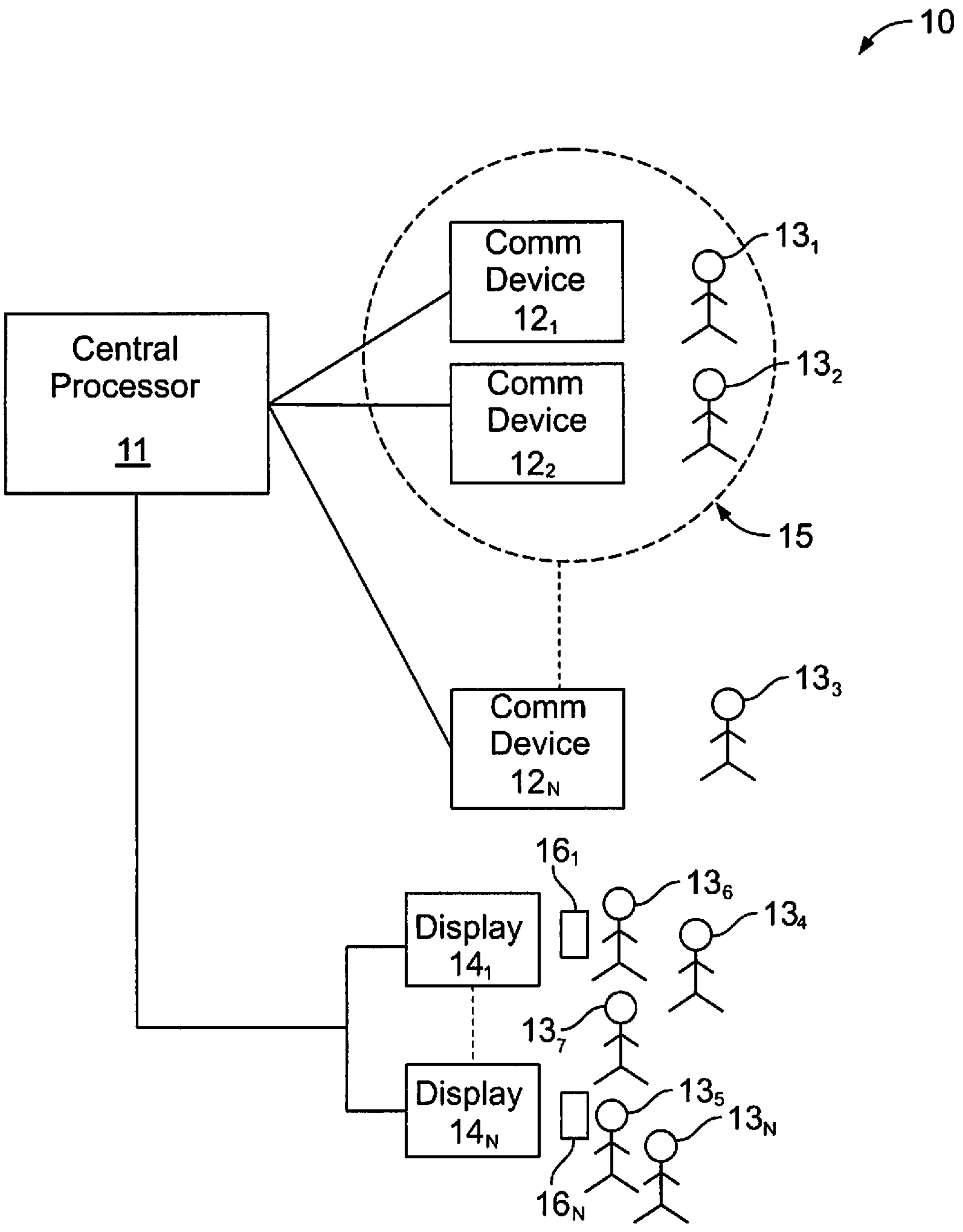
FIG. 1 is a block diagram of an exemplary system for implementing reverse gaming.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 is a block diagram of an exemplary system 10 for implementing reverse gaming. Generally, the system 10 is configured with a central processor 11 which is used to process votes received from players $\mathbf{13}_{1 \ldots N}$ (wherein N is used multiple times herein merely to imply an integer greater than 1). The votes are intended to influence the outcome of a particular game being implemented by the system 10. For example, the system 10 may implement the game of Bingo. As opposed to players waiting to hear the results of a number drawn by the Bingo "caller", the players 13 vote for the numbers that they desire. The central processor 11 then tallies the votes to determine a Bingo number to be called.

In this embodiment, a communication device 12 is provided to the players 13 such that the players may transfer their votes to the central processor 11. The communication device may be a computing device (e.g., a cell phone, a PDA, a personal computer, a computer kiosk, or the like) that provides the players 13 with the ability to select a number in the Bingo game and transfer that desired selection to the central processor 11. For example, after a number is called in a Bingo game, each of the players $\mathbf{13}_{1 \ldots N}$ may desire a number that will improve their chances of winning. In this regard, each of the players $\mathbf{13}_{1 \ldots N}$ may vote for their desired number and transfer those votes to the central processor 11. The vote transfer may be implemented in a variety of ways (e.g., Internet communications, wireline communications, radio frequency (RF) communications, SMS, cell phone text messaging, or the like).

The votes may be acquired by the players $\mathbf{13}_{1 \ldots N}$ in a variety of ways. For example, once a player 13 has attained a certain status (e.g., spending a certain amount of money, winning a predetermined number of games, etc.), the system 10 may provide extra votes the players such that the player may strategically spend those votes on a desired number at a point in the game. Alternatively or additionally, the players $\mathbf{13}_{1 \ldots N}$ may purchase additional voting opportunities. For example, to improve a player's odds of winning, a player 13 may be provided the opportunity to purchase additional votes that can be strategically spent by the player during certain periods of the game.

Once the votes are received by the central processor 11, the central processor may tally the votes and determine the next Bingo number based on a number of votes. For example, the next Bingo number may be chosen based on a majority of votes for a particular Bingo number. After determining the next Bingo number, the central processor 11 may communicate that number back to the communication devices $\mathbf{12}_{1 \ldots N}$ as input to the players' $\mathbf{13}_{1 \ldots N}$ Bingo cards. The reverse gaming scenarios, however, are not intended to be limited to simply a majority vote. Rather, the reverse gaming scenarios described herein may be implemented with other types of voting qualifications such as a minority vote or some other algorithmic voting scheme. Other examples of voting include the Coombs' method, supplementary voting, cumulative voting Bucklin voting, proportional methods of voting (e.g., such as the Sainte-Laguë method and the d'Hondt method), plurality runoff voting, instant-runoff voting, approval, range voting, Borda, minimax, Schulze, ranked pairs, Kemeny-Young, the Condorcet method, and the like. In one embodiment, the votes are displayed to the players $\mathbf{13}_{1 \ldots N}$ as the votes are being cast during the period of time before a number is to be called such that the players can react by spending more votes.

As an alternative or additional feature to the reverse gaming system 10 of FIG. 1, the central processor 11 may be configured to transfer the selected number to a display 14 such that the players 13 may input the number into their respective games. For example, the game being implemented by the reverse gaming system 10 may employ physical game cards that are distributed to the players 13. In this regard, each of the game cards may have numbers that are randomly fashioned therewith as in a typical Bingo game. The players 13 communicate their desired numbers to the central processor 11 as votes and the central processor 11 then determines a number from the votes. Thereafter, the central processor 11 may communicate that number to the players by means of displays $\mathbf{14}_{1 \ldots N}$. Such an implementation may consist of televisions and/or computer terminals that show the next voted on number where one or more of the players $\mathbf{13}_{1 \ldots N}$ can view. From there, the players 13 mark their cards accordingly (i.e., if those cards include that number).

By having the players 13 vote on numbers to be called, the reverse gaming system 10 may create an environment in which the players 13 cooperate with one another to vote. For example, the players $\mathbf{13}_1$ and $\mathbf{13}_2$ may conspire to produce a vote as a group 15 (i.e., a group vote). That group vote may be representative of a strategy being employed by the players $\mathbf{13}_1$ and $\mathbf{13}_2$ or even as simple as a common number that the two players have. The group 15, however, is not intended to be limited to a defined number or set of players 13. Rather, the players 13 could cooperate with virtually any player. For example, the player $\mathbf{13}_1$ may cooperate with the player $\mathbf{13}_2$ prior to a first number being called and then cooperate with players $\mathbf{13}_3$ and $\mathbf{13}_6$ prior to the next number being called.

Although shown and described with respect to certain means of communication, the system 10 is not intended to be so limited. For example, the displays 14 are merely intended as illustrations of a manner in which voted on numbers may be communicated to the players 13. In this regard, the displays 14 are not intended to be limiting. That is, the displays 14 could also be implemented as audio communications, even with an actual person merely speaking the next voted on number as in a typical Bingo hall scenario.

Also shown in this embodiment are the kiosks $\mathbf{16}_{1 \ldots N}$ that the players may use to play their reverse games. For example, the kiosks may be computer terminals that communicate with the central processor 11 such that the players 13 may vote on their desired numbers and communicate those selections to the central processor. The central processor 11 may then communicate the voted on number to the players 13 via any of the ways described hereinabove (e.g., a display 14, the communication device 12, the computer kiosk 16, orally).

Figure 2:
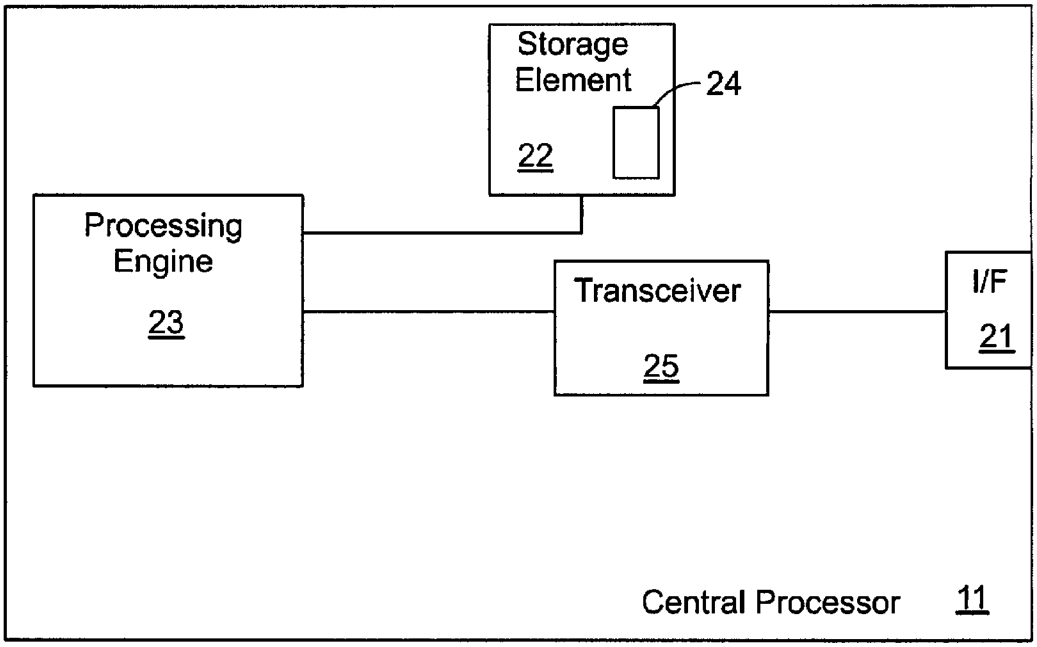
FIG. 2 is a block diagram of an exemplary central processor.

FIG. 2 is a block diagram of an exemplary central processor 11 as illustrated in FIG. 1. In this embodiment, the central processor 11 is computerized and includes a processing engine 23 that is used to process rules associated with the game of chance. For example, the processing engine 23 may be communicatively coupled to the storage element 22, which is used to store game rules 24. These game rules 24 are generally used to implement the reverse gaming scenarios as described hereinabove. For example, the game rules 24 may include software instructions that pertain to reverse Bingo, reverse Keno, reverse lottery, reverse Blackjack, reverse Poker, reverse Roulette, reverse Baccarat, reverse Poker, and other casino games, wherein players vote on game parameters (e.g., a number to be called in Bingo or a card to be called in Blackjack or Poker).

The processing engine 23 may access the game rules 24 to initiate electronic playing of the game. In this regard, the processing engine 23 may distribute electronic game modules to the players via the transceiver 25 and the interface 21. For example, the transceiver 25 may be configured to receive data from the processing engine 23 and transfer that data to the players via the interface 21. The interface 21 may be configured in a variety of ways. For example, the interface 21 may be an RF interface that communicates information to the communication devices 12 of FIG. 1. In this regard, the processing engine 23 may process the game rules 24 and generate data representative of game modules, such as electronic Bingo cards, therefrom such that the transceiver 25 may modulate the data and communicate it to the communication devices 12. Alternatively, the transceiver 25 may be a means for communicating landline data representative of the game modules. For example, the transceiver 25 may be a data means for transferring electronic data over various electronic communication links, such as the Internet.

The central processor 11 is also configured for receiving data from the players. For example, the players 13 of FIG. 1 may communicate their votes to the central processor via their communication devices 12. The interface 21 may receive those votes and communicate those to the processing engine 23 via the transceiver 25. In an RF embodiment, the transceiver 25 made demodulate RF transmissions from the communication devices 12 such that the data resulting therefrom may be processed by the process engine 23.

Alternatively or additionally, the processing engine 23 may be configured for encrypting and decrypting data. For example, to add security to the reverse gaming system, the processing engine 23 may encrypt data pertaining to the reverse game. In this regard, the communication devices 12 or other means may decrypt the data and input an underlying game parameter (e.g., a Bingo number) to the players' game modules. Similarly, data from the communication devices 12 may also be encrypted such that player's votes are more secure.

Figure 3:
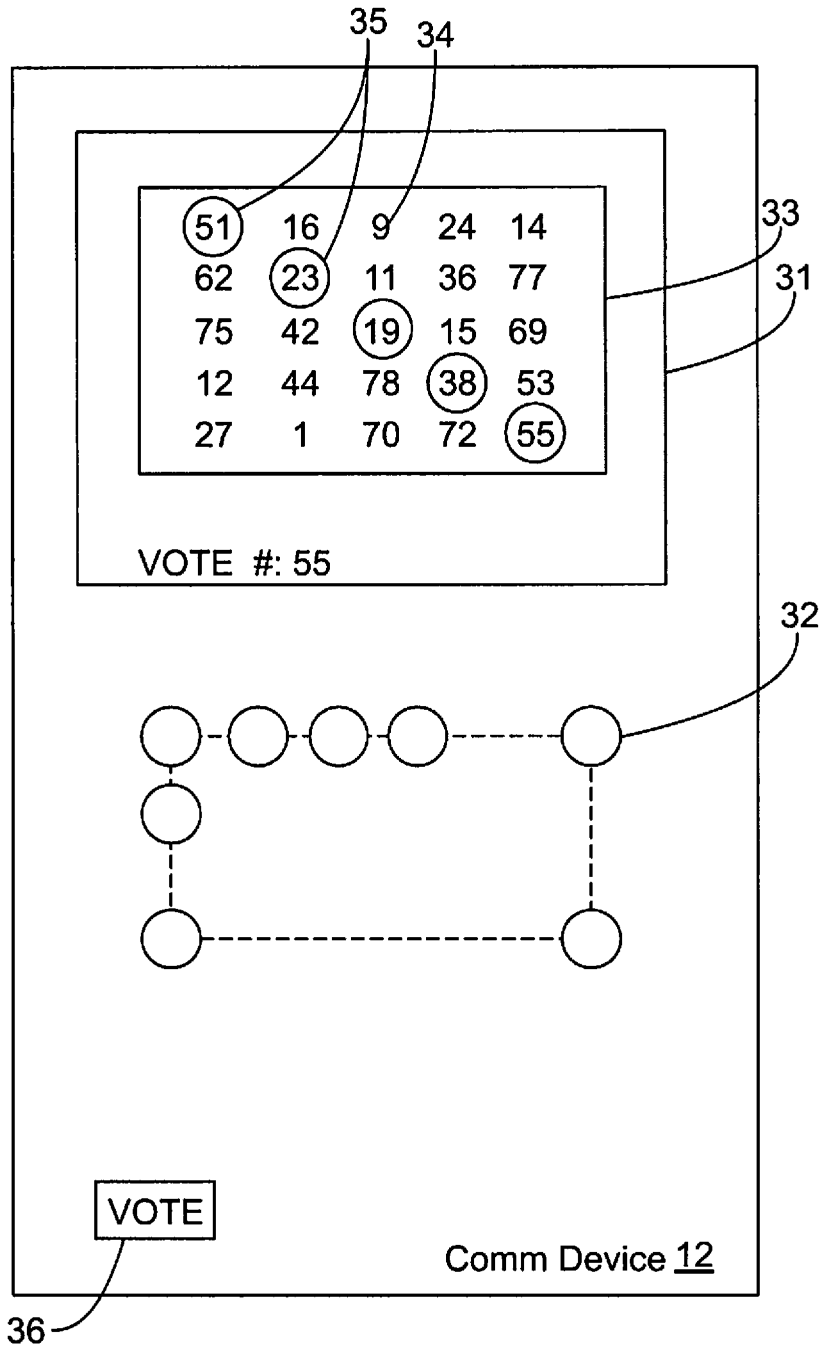
FIG. 3 is an illustration of an exemplary communication device.

FIG. 3 is an illustration of the exemplary communication device 12 as illustrated in FIG. 1. In this embodiment, the communication device 12 is configured with a graphical user interface 31 that is used to display various aspects of a game. For example, an electronic Bingo game 33 is illustrated within the graphical user 31 interface of the communication device 12. The Bingo game consists of various numbers displayed in a 5×5 arrangement with "called numbers" 35 (i.e., 51, 23, 19, 38, and 55) being highlighted with circles. In other words, the numbers that are determined by the central processor 11 are input to the communication device 12 and highlighted when the central processor number corresponds to a number on the player's Bingo game 33. Other numbers 34 are simple not marked, although other forms of highlighting may be used.

Figure 4:
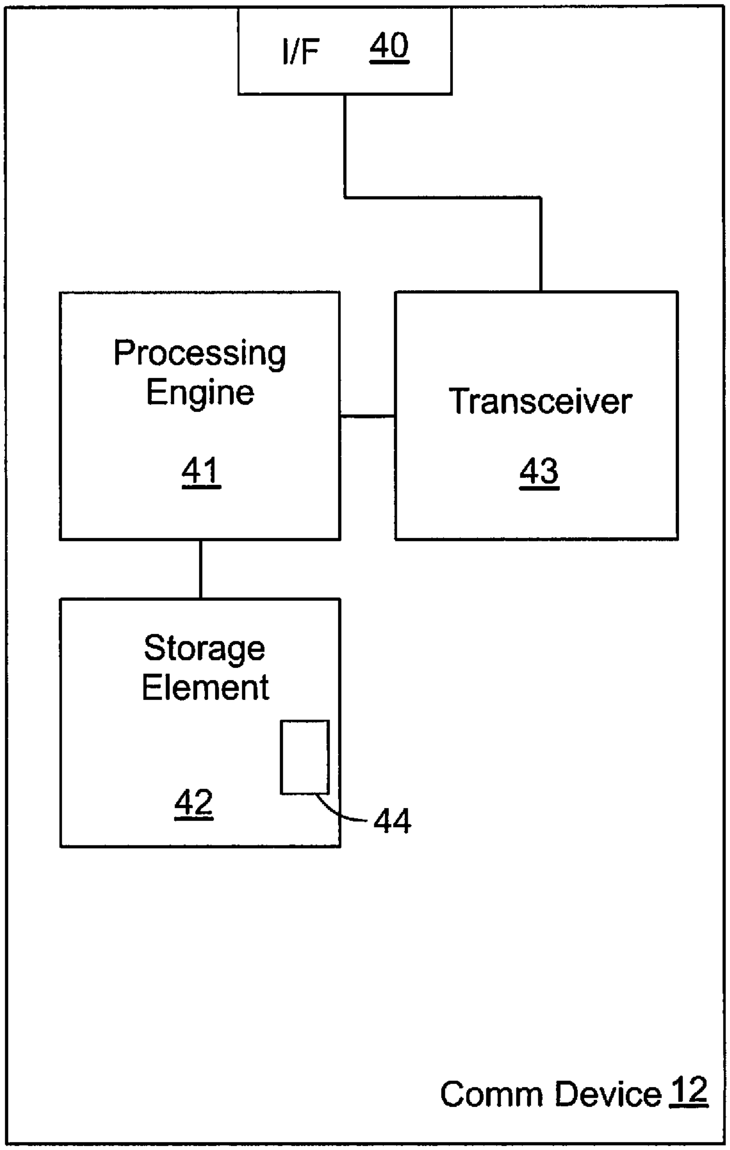
FIG. 4 is a block diagram of an exemplary communication device.

Also illustrated in this embodiment is a vote made by the player during a game. For example, the communication device 12 may be configured with buttons 32 that allow a player to select a certain game parameter, much like a cellular telephone is configured with buttons that enable the user to dial a phone number. The communication device 12 may also be configured with a button 36 that enters a vote thereby causing the desired number to be transferred to the central processor 11. In this regard, FIG. 4 illustrates a block diagram of components that may be used within the communication device 12.

The communication device 12 may include a processing engine 41 that is used to access certain game rules and/or other functionality 44 that are stored with the storage element 42. For example, the game rules/functionality 44 may include software instructions a direct the processing engine 41 to display a particular game (e.g., the Bingo game 33 of FIG. 3). In this regard, the central processor 11 may communicate data regarding the game (including, for example, a game card) to the communication device 12. The processing engine 41 may then process that data according to the game rules 44 such that the game may be displayed.

To communicate with the central processor 11, the communication device 12 may also be configured with a transceiver 43. For example, the transceiver 43 may modulate or otherwise prepare data for transmission to the central processor 11 via the interface 40. In this regard, the transceiver 43 may configure data for transmission via RF. An example of the data flow between a communication device 12 and a central processor 11 is further illustrated in FIG. 5.

Figure 5:
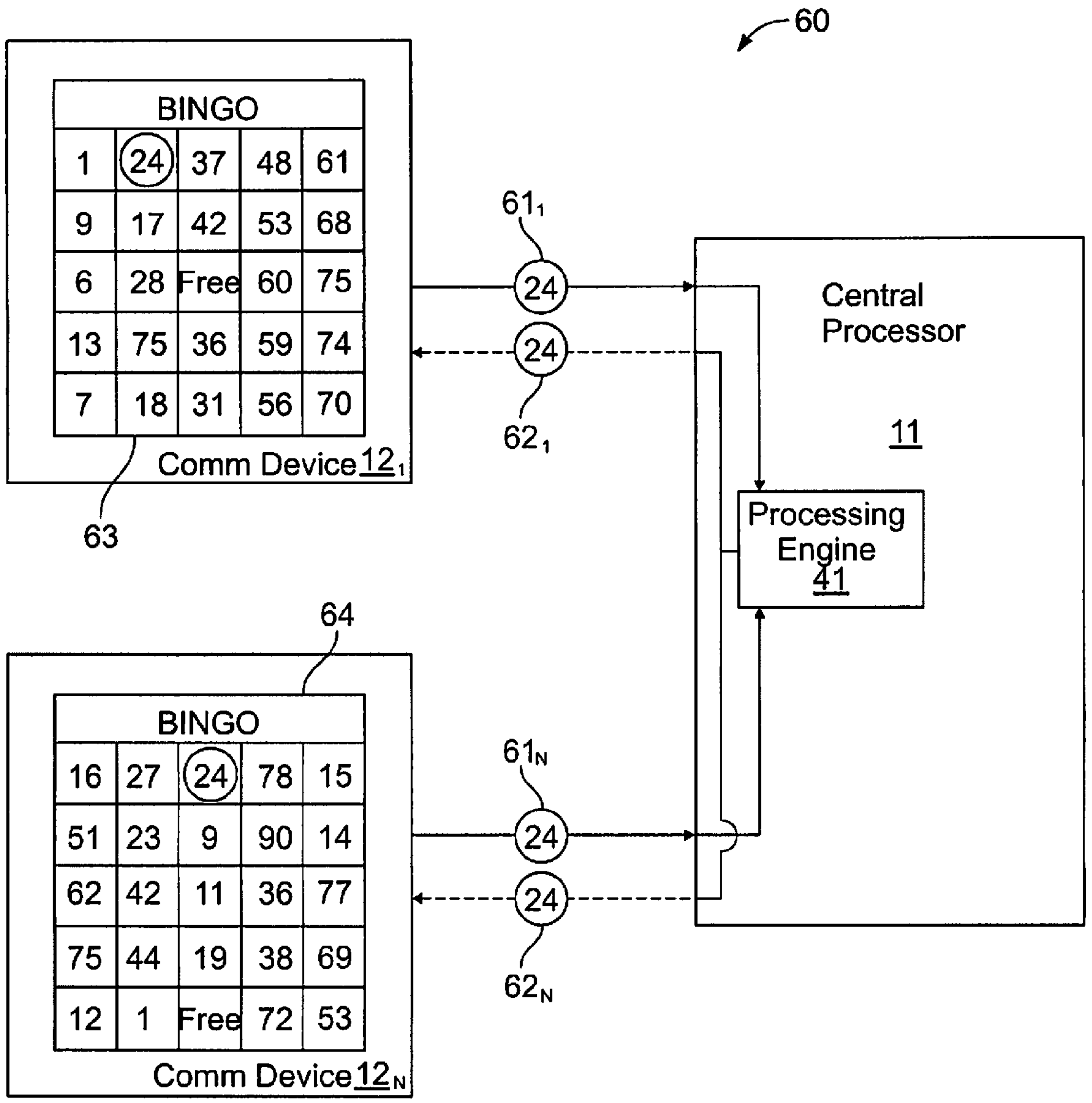
FIG. 5 is an illustration of an exemplary reverse gaming system process flow.

FIG. 5 illustrates a block diagram of a system 60 that is used to implement a reverse Bingo game. In this embodiment, a first communication device $\mathbf{12}_1$ may have one electronic Bingo game card 63 being implemented therewith whereas a second communication device $\mathbf{12}_N$ may have another electronic Bingo game card 64 being implemented during the same Bingo game. The communication devices $\mathbf{12}_1$ and $\mathbf{12}_N$ may be used to transmit a number desired by the players of the respective devices. In this instance, the desired number is 24 and that number is transmitted to the central processor 11 from the communication devices $\mathbf{12}_1$ and $\mathbf{12}_N$ via communication paths $\mathbf{61}_1$ and $\mathbf{61}_N$, respectively. Similarly, other communication devices may be transferring desired numbers to the central processor 11. Once received, the processing engine 41 may process the desired numbers (i.e., votes) to generate a number that is implemented in the game. In this instance, the central processor 11 determined that the votes from the communication devices $\mathbf{12}_{1 \ldots N}$ require a number 24 be the next number implemented in each of the Bingo games of the communication devices $\mathbf{12}_1$ and $\mathbf{12}_N$. The number 24 is then communicated to the communication devices $\mathbf{12}_1$ and $\mathbf{12}_N$ via the communication paths $\mathbf{62}_1$ and $\mathbf{62}_N$, respectively.

Again, although shown and described with respect to a Bingo game, the invention is not intended to be so limited. Rather, the communication devices shown herein may be used to implement a variety of games as described hereinabove.

Figure 6:
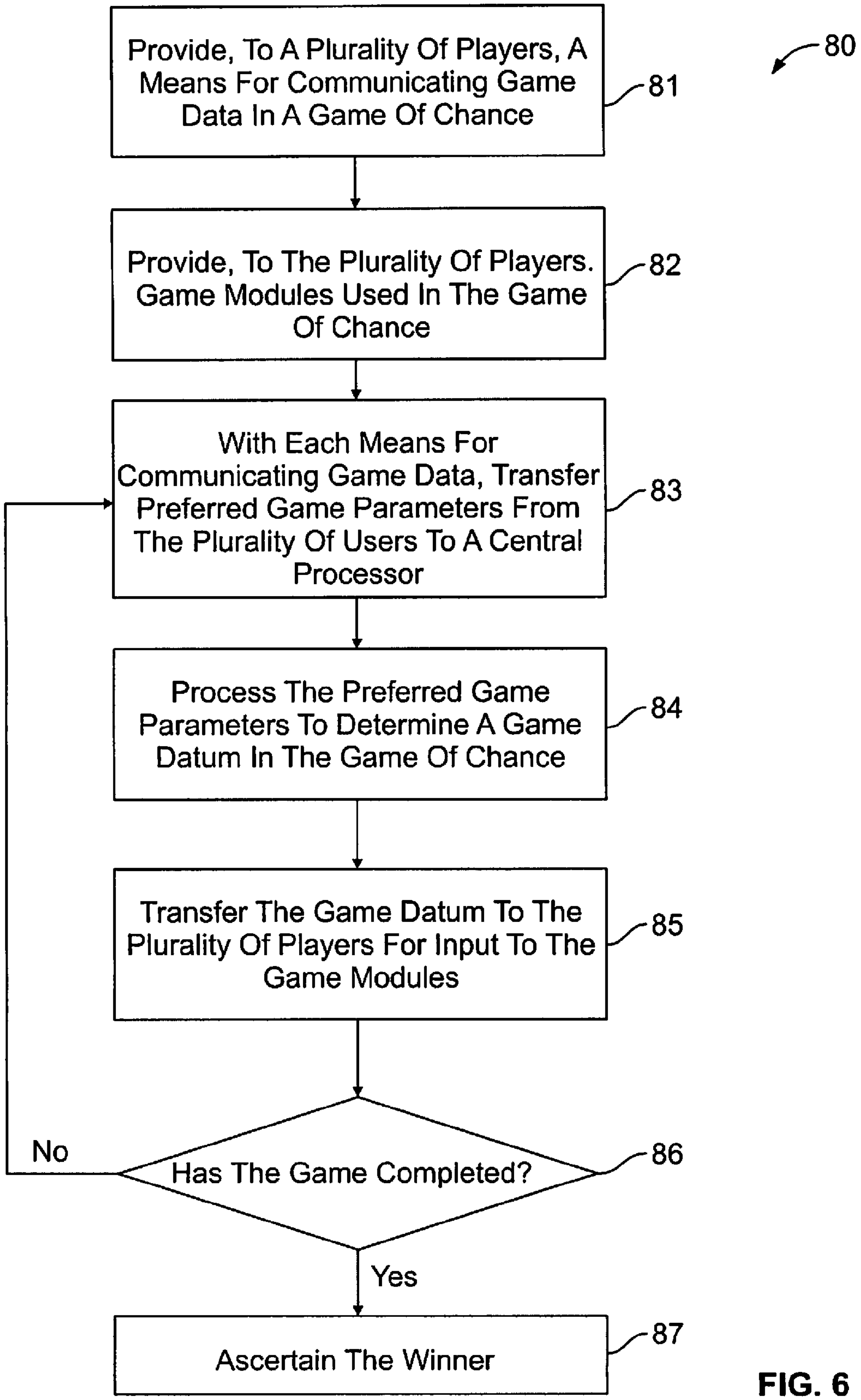
FIG. 6 is a flow chart of an exemplary process for reverse gaming.

FIG. 6 is a flow chart of an exemplary process 80 for reverse gaming. In this embodiment, players of a game of chance are provided with a means for communicating game data, in the process element 81. These means for communicating game data may transfer certain game parameters to a central processor, e.g., in the form of votes. Additionally, the means for communicating the game data may receive certain game parameters from the central processor for implementation within an operable game of chance. In the process element 82, the players are also provided with game modules used in the game of chance. For example, the players may be provided with Bingo cards having numbers with certain random distributions therewith. In this regard, the means for communicating the game date may receive Bingo numbers from the central processor for implementation in the Bingo cards being played.

With the game communication means and the games themselves distributed to the players, game parameters may be transferred from the plurality of users to a central processor, in the process element 83. For example, the players may use their communication means to select certain game parameters, such as Bingo numbers that would be desirable within their current Bingo games. These game parameters are transferred to the central processor as votes for a desired number. In the process element 84, the central processor may process the preferred game parameters to determine a game datum that is to be implemented in the game of chance. For example, the central processor may ascertain a number to be used as an input to the individual Bingo games of the players. This ascertained number may be based on the number of votes received for a particular number as described hereinabove. The central processor may then transfer the game datum to the plurality of players for input to their respective game modules, in the process element 85.

The game being played on the players' communication means is generally configured with an end. For example, in Bingo, a player may win when a player obtains five numbers in a single column or some other pattern. Other games, such as Keno, may have a player winning when a certain subset of chosen numbers has been attained by the player. In this regard, the central processor 11 may determine if the game has completed, in the process element 86. Such may be determined by a player submitting a game validation to the central processor. For example, once a player believes that the requirements for a win have been met in the particular game of chance being played, the player may transfer the player's game card to the central processor 11 for verification of the win. If the player has indeed won the game, the central processor will ascertain the winner in the process element 87, assign any awards associated therewith, and end the game. If, however, the game has not completed, the process 80 returns to the process element 83 wherein the players vote on additional game parameters for determination of a game datum in the game of chance.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

The invention claimed is:

1. A method of providing a game of chance that enables players to control an outcome of the game of chance, the method including:

providing communication devices to the players for communicating game data in the game of chance;

providing game modules to the players that are used in the game of chance;

transferring preferred game parameters from the communication devices of the players to a central processor, the preferred game parameters representative of votes of the players for a desired game datum of the game of chance, at least one of the preferred game parameters representative of a collaborative vote of a subset of the players that is formed by the subset of the players prior to transferring the collaborative vote to the central processor;

processing the preferred game parameters to determine an actual game datum in the game of chance based on the votes; and transferring the actual game datum to the players for input to the game modules, wherein the actual game datum at least partially determines the outcome of the game of chance.

2. The method of claim 1, wherein the providing the game modules to the players includes electronically conveying the game modules to the players via the communication devices.

3. The method of claim 1, wherein the providing the communication devices includes providing computer processors for processing the game datum transferred to the players and inputting the game datum into the game modules.

4. The method of claim 1, wherein the providing the game modules to the players includes presenting physical game modules to the players.

5. The method of claim 1, wherein the game of chance is at least one of: Bingo; Keno; Lottery; Blackjack; Poker; Craps; Baccarat; a video casino game; or Roulette.

6. The method of claim 1, wherein the transferring the actual game datum to the players includes electronically transferring the actual game datum to players.

7. The method of claim 6, wherein the electronically transferring the actual game datum to the players includes conveying the actual game datum to the communication devices.

8. The method of claim 6, wherein the electronically transferring the game datum to the players includes transmitting the actual game datum to the communication devices via radio frequency.

9. The method of claim 1, further including encrypting the actual game datum prior to transferring the actual game datum to the communication devices.

10. The method of claim 1, wherein the processing the preferred game parameters includes determining the actual game datum based on a number of the votes from the players.

11. The method of claim 1, further including providing a game environment that enables at least the subset of the players to cooperate together and determine the collaborative vote of the subset of the players prior to transferring the preferred game parameter representative of the collaborative vote to the central processor.

12. The method of claim 1, wherein the providing the game modules includes configuring the game modules with randomized game parameters.

13. The method of claim 1, further comprising repeating said transferring preferred game parameters, processing the preferred game parameters, and transferring the game datum until the outcome of the game is reached, wherein the transferred game datum differs from a previously transferred game datum.

14. The method of claim 1, further comprising providing each of the players with a number of votes to cast as the preferred game parameters, the number of votes for each player based on at least one of an amount won by the player, a number of the games of chance won by the player, or a number of the games of chance lost by the player.

15. The method of claim 1, wherein the processing the preferred game parameters includes selecting the actual game datum in the game of chance when the votes for the actual game datum from the players is less than a majority vote of the players.

16. The method of claim 1, wherein the collaborative vote is based on a comparison of the game modules of the plurality of players participating in the collaborative vote.

17. A method of providing a game of chance that enables players to control an outcome of the game of chance, the method including:

providing game cards to the players, wherein each game card has a predetermined number of game characteristics of the game of chance;

providing communication devices to the players, wherein the communication devices receive votes from the players with each vote corresponding to at least one of the predetermined game characteristics, at least one of the votes representative of a collaborative vote formed by a subset of the players prior to the communication devices transmitting the collaborative vote to a central processor;

processing the votes at the central processor to select at least one of the game characteristics as a voted game characteristic;

transferring the voted game characteristic to the players as input to the game cards, wherein the voted game characteristic at least partially determines the outcome of the game of chance.

* * * * *